(12) United States Patent
Requena et al.

(10) Patent No.: US 8,990,302 B2
(45) Date of Patent: Mar. 24, 2015

(54) CONTEXT DATA IN UPNP SERVICE INFORMATION

(71) Applicant: Core Wireless Licensing, S.A.R.L., Luxembourg (LU)

(72) Inventors: Jose Costa Requena, Helsinki (FI); Markku Tamski, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

(21) Appl. No.: 13/674,806

(22) Filed: Nov. 12, 2012

(65) Prior Publication Data

US 2013/0173705 A1 Jul. 4, 2013

Related U.S. Application Data

(62) Division of application No. 10/922,417, filed on Aug. 20, 2004, now Pat. No. 8,312,132.

(51) Int. Cl.
*G06F 15/16* (2006.01)
*H04L 12/24* (2006.01)
*G06F 17/30* (2006.01)
*H04L 29/08* (2006.01)
*H04W 4/02* (2009.01)

(52) U.S. Cl.
CPC ...... *H04L 41/0809* (2013.01); *G06F 17/30194* (2013.01); *H04L 67/10* (2013.01); *H04L 67/16* (2013.01); *H04W 4/02* (2013.01)
USPC ........................................................ 709/204

(58) Field of Classification Search
CPC ............ H04L 67/16; G06F 17/308908; G06F 17/308911

USPC .......................................................... 709/204
See application file for complete search history.

(56) References Cited

U.S. PATENT DOCUMENTS

| | | | | |
|---|---|---|---|---|
| 5,598,572 A | * | 1/1997 | Tanikoshi et al. | 712/30 |
| 5,682,332 A | * | 10/1997 | Ellenby et al. | 702/150 |
| 6,611,242 B1 | | 8/2003 | Hongo et al. | |
| 6,643,650 B1 | * | 11/2003 | Slaughter et al. | 1/1 |
| 6,911,968 B2 | | 6/2005 | Shah-Nazaroff | |

(Continued)

FOREIGN PATENT DOCUMENTS

EP 1379049 A1 1/2004

OTHER PUBLICATIONS

Extended European Search Report for EP Patent Application No. 05786440.7, dated Nov. 29, 2012.

*Primary Examiner* — Imad Hussain
(74) *Attorney, Agent, or Firm* — Core Wireless Licensing Ltd

(57) ABSTRACT

A system, device, and method provide for the selection of a device to perform a service using context information for the device. The context information may be included in a request from a control point device to the device or may be included in a response from the device to the control point device. The context information provides additional information relative to the services provided by the device or relative to the device itself. For example, if the device is a camera, the camera may include for each photograph taken by the camera a date the photograph is taken, a time the photograph is taken, a location at which the photograph is taken, a subject matter of the photograph, a temperature at the photograph location, a photographer, etc in the context information. Additionally, the camera may include the current geographic location of the camera in the context information.

19 Claims, 5 Drawing Sheets

(56) References Cited

U.S. PATENT DOCUMENTS

| | | | |
|---|---|---|---|
| 6,993,570 B1* | 1/2006 | Irani | 709/218 |
| 7,249,100 B2* | 7/2007 | Murto et al. | 705/50 |
| 7,412,518 B1* | 8/2008 | Duigou et al. | 709/227 |
| 7,668,908 B2* | 2/2010 | Kakivaya et al. | 709/204 |
| 7,676,472 B2* | 3/2010 | Kurhekar et al. | 707/999.01 |
| 7,685,288 B2* | 3/2010 | Kakivaya et al. | 709/227 |
| 7,984,162 B2* | 7/2011 | Pujol et al. | 709/227 |
| 2002/0046239 A1* | 4/2002 | Stawikowski et al. | 709/203 |
| 2002/0083143 A1* | 6/2002 | Cheng | 709/208 |
| 2002/0120685 A1* | 8/2002 | Srivastava et al. | 709/203 |
| 2002/0176579 A1* | 11/2002 | Deshpande et al. | 380/270 |
| 2002/0194498 A1* | 12/2002 | Blight et al. | 713/201 |
| 2003/0004744 A1* | 1/2003 | Greene et al. | 705/1 |
| 2003/0005128 A1* | 1/2003 | Hickman et al. | 709/227 |
| 2003/0033369 A1* | 2/2003 | Bernhard | 709/203 |
| 2003/0061333 A1* | 3/2003 | Dean et al. | 709/223 |
| 2003/0110242 A1* | 6/2003 | Brown et al. | 709/222 |
| 2003/0163450 A1* | 8/2003 | Borenstein et al. | 707/1 |
| 2003/0193572 A1* | 10/2003 | Wilson et al. | 348/207.99 |
| 2003/0195923 A1* | 10/2003 | Bloch et al. | 709/203 |
| 2003/0220925 A1* | 11/2003 | Lior | 707/10 |
| 2004/0009769 A1* | 1/2004 | Yokoyama | 455/423 |
| 2004/0043758 A1* | 3/2004 | Sorvari et al. | 455/414.1 |
| 2004/0068586 A1* | 4/2004 | Xie et al. | 709/246 |
| 2004/0073609 A1* | 4/2004 | Maekawa et al. | 709/203 |
| 2004/0078424 A1* | 4/2004 | Yairi et al. | 709/203 |
| 2004/0083262 A1* | 4/2004 | Trantow | 709/203 |
| 2004/0117156 A1* | 6/2004 | Newman et al. | 702/187 |
| 2004/0128344 A1* | 7/2004 | Trossen | 709/203 |
| 2004/0267876 A1* | 12/2004 | Kakivaya et al. | 709/200 |
| 2005/0021714 A1* | 1/2005 | Yook et al. | 709/223 |
| 2005/0080768 A1* | 4/2005 | Zhang et al. | 707/3 |
| 2005/0096753 A1* | 5/2005 | Arling et al. | 700/11 |
| 2005/0138173 A1* | 6/2005 | Ha et al. | 709/225 |
| 2005/0159823 A1* | 7/2005 | Hayes et al. | 700/19 |
| 2005/0232189 A1* | 10/2005 | Loushine | 370/328 |
| 2005/0282556 A1* | 12/2005 | Morris | 455/456.1 |
| 2006/0142935 A1* | 6/2006 | Koerber | 701/200 |
| 2007/0005777 A1* | 1/2007 | Fremantle et al. | 709/228 |
| 2007/0011285 A1* | 1/2007 | Chraiet et al. | 709/223 |
| 2009/0287812 A1* | 11/2009 | Weber et al. | 709/224 |
| 2010/0146035 A1* | 6/2010 | Matsa et al. | 709/202 |
| 2012/0054657 A1 | 3/2012 | Nurmi | |
| 2012/0144404 A1* | 6/2012 | Cipresso et al. | 719/314 |

* cited by examiner

CONTEXT DATA IN UPNP SERVICE INFORMATION

CROSS-REFERENCE TO RELATED PATENT APPLICATIONS

This application is a Divisional of U.S. patent application Ser. No. 10/922,417 entitled "CONTEXT DATA IN UPNP SERVICE INFORMATION" filed Aug. 20, 2004, and is incorporated herein in its entirety as if set forth in full.

FIELD OF THE INVENTION

The present invention is related to networks. More particularly, the present invention relates to resource discovery in a UPNP environment using context information.

BACKGROUND OF THE INVENTION

Universal Plug and Play (UPnP™) defines an architecture for the network connectivity of intelligent consumer electronics, wireless devices, printers, and PCs of all form factors. The goal of UPnP technology is to provide easy-to-use, flexible, standards-based connectivity for ad-hoc or unmanaged networks whether in a home, in a small business, or in public spaces. In support of this goal, UPnP supports zero-configuration, "invisible" networking, and the automatic discovery of devices from a wide range of manufacturers. As a result, a device can dynamically join a network, obtain an IP address, convey its capabilities to the network, and determine the presence and capabilities of other devices. UPnP also provides a consistent, interoperable framework for remote Internet Gateway Device (IGD) configuration and management. UPnP is built using Hypertext Transfer Protocol (HTTP) over the User Datagram Protocol/Internet Protocol (UDP/IP) or the Transmission Control Protocol/Internet Protocol (TCP/IP) in addition to the eXtensible Markup Language (XML). HTTPU and HTTPMU are variants of HTTP defined to deliver messages over UDP/IP instead of TCP/IP.

Devices on a UPnP network can be connected using any communication media including Radio Frequency wireless (including Radio Frequency IDentification (RFID)), phone line, power line, IrDA, Ethernet, and Institute of Electrical and Electronics Engineers (IEEE) 1394. Thus, any communication medium that can be used to network devices can enable UPnP.

UPnP is an open networking architecture that consists of services, devices, and control points. Services are groups of states and actions. For example, a light switch has an "on" state and an "off" state. An action allows the network to determine the state of the switch or to change the state of the switch and is a command that can be used to trigger services to perform a function. Services typically reside in devices and provide device functionality that can be controlled using control points. A device may be a physical device such as a camcorder or a logical device such as a computer that is performing the functions of a camcorder. Devices may be physical or logical entities and are specified using simple XML descriptions and containing Application Programming Interfaces (APIs) for providing services. Physical devices may host multiple logical devices, and each device may host multiple services. Control points are software applications that retrieve UPnP service and device descriptions, that send actions to services, and that receive events from services. A control point is capable of discovering and controlling other devices. An event is a message from a device to a control point that is used to keep subscribed control points informed of device status. A UPnP device may be a container for services and nested devices. For example, a combination TV/DVD player provides services and includes a nested device that may be the DVD player, for example.

Messages are transported over UPnP networks using HTTP over the UDP/IP or TCP/IP. The supported message formats are Simple Service Discovery Protocol (SSDP), General Event Notification Architecture (GENA), and Simple Object Access Protocol (SOAP). UPnP relies on these three protocols to enable networking without a classical network administrator. SSDP provides for the discovery of devices on the network. GENA provides for subscribing to event reports and for the publication of those events. SOAP provides for control of the network devices through remote procedure calls between control points and devices. Required UPnP information is inserted into all messages before they are formatted using SSDP, GENA, and SOAP and delivered via HTTP, HTTPU, or HTTPMU.

Given an IP address, the first step in UPnP networking is discovery. The discovery process for a UPnP device includes advertisement of the device presence on the network to other devices and control points using SSDP. Thus, when a device is added to a network, the device advertises its services to the control points on the network. Similarly, a new control point discovers UPnP devices on a network using SSDP. If an SSDP service hears a discovery request that matches a service that it offers then the service responds to the control point. Thus, UPnP allows a control point to search for devices of interest on the network.

The information exchanged between the device and the control point in both cases is a discovery message that provide basic information about the devices or one of its services, and a description Uniform Resource Locator (URL) that can be used to gather additional detailed information about the device. XML is used to describe the device features and capabilities. The notification announcement message URL points to an XML file in the network that contains a description of the UPnP device's capability. Thus, by retrieving the XML file, other devices can evaluate the features of the device and determine if the features satisfy their requirements. Thus, after a control point discovers a device, the control point retrieves the device's service description from the URL provided by the device in the discovery message. The UPnP description for a device includes a list of any embedded devices or service, as well as URLs for control, for eventing, and for presentation.

The UPnP description for a service includes a list of actions the service responds to and a list of variables that model the state of the service. The service publishes updates when these variables change by sending event messages. A control point may subscribe to this information so that it automatically receives the updates. Event messages contain the names of one of more state variables and the current value of those variables. These messages are also expressed in XML and formatted using GENA. Thus, after retrieving the description of the device, the control point can send actions to a device's service by sending a suitable control message to the control URL for the service.

Control messages are also expressed in XML using SOAP. In response to the control message, the service returns any action-specific values. Additionally, if a device has a URL for presentation, the control point can retrieve a page from this URL, load the page into a browser, and depending on the capabilities of the page, allow a user to control the device and/or view device status. Each UPnP control request is a SOAP message that contains the action to invoke along with a set of parameters. The response is a soap message as well and contains the status, return value, and any return parameters. The control point can refine the search to find only devices of a particular type, that perform particular services, or a specific device. The control point can not, however, refine the search based on context information. Context information includes additional information about the device and the services that the device is capable of providing. For example, the context information may include the current geographic location of the device. Context information may include the device availability for example if the device is a printer or a facsimile machine.

What is needed, therefore, is a method of including context information to refine a search for a device or a search for an item at a device in a UPnP environment. What is further needed is a method of including the existence of context information to refine a search for a device in a UPnP environment.

SUMMARY OF THE INVENTION

An exemplary embodiment of the invention relates to a device for performing a service for a second device. The device includes, but is not limited to, a memory, a communication interface, and a processor. The memory stores a device service description, wherein the device service description includes context information of the device. The communication interface is configured to receive a request sent from a first device using a network, the request to retrieve the device service description, and to send a response to the first device using the network, the response including the device service description. The processor couples to the communication interface and to the memory and is configured to select the device service description from the memory and to create the response including the device service description.

A format of the response may be, but is not limited to, a Simple Service Discovery Protocol and a Simple Object Access Protocol. A format of the request may be, but is not limited to, a Simple Service Discovery Protocol and a Simple Object Access Protocol. The context information may include, but is not limited to, a geographic location of the device.

Another exemplary embodiment of the invention relates to a device for selecting another device to perform a service. The device includes, but is not limited to, a communication interface and a processor. The communication interface is configured to send a first request to a first device using a network, the first request to retrieve a first device service description from the first device, the first device service description including context information of the first device, and to receive a first response from the first device using the network, the first response including the first device service description. The processor couples to the communication interface and is configured to select the first device to perform a first service for the device based on the context information of the first device included in the first device service description.

A format of the response may be, but is not limited to, a Simple Service Discovery Protocol and a Simple Object Access Protocol. A format of the request may be, but is not limited to, a Simple Service Discovery Protocol and a Simple Object Access Protocol. The context information may include, but is not limited to, a geographic location of the device.

The processor may be further configured to determine a geographic location of the device, to determine a pointing direction to the first device from the device, and to identify the first device based on the pointing direction to the first device from the device, the geographic location of the first device, and the geographic location of the device. The communication interface may be further configured to send a second request to a second device using the network, the second request to retrieve a second device service description from the second device, the second device service description including context information of the second device, and to receive a second response from the second device using the network, the second response including the second device service description. The processor may be further configured to select the second device to perform a second service related to the first service for the device based on the context information of the second device included in the second device service description. The context information of the second device may include, but is not limited to, a geographic location of the second device. The processor may be further configured to determine a pointing direction to the second device from the device and to identify the second device based on the pointing direction to the second device from the device, the geographic location of the second device, and the geographic location of the device.

Another exemplary embodiment of the invention relates to a system for selecting a device to perform a service. The system includes, but is not limited to, a first device and a second device. The first device includes, but is not limited to, a memory, a first communication interface, and a first processor. The memory stores a first device service description wherein the first device service description includes context information of the first device. The first communication interface is configured to receive a first request from a second device using a network, the first request to retrieve the first device service description from the first device, and to send a first response to the second device using the network, the first response including the first device service description. The first processor couples to the first communication interface and to the memory and is configured to select the first device service description from the first memory and to create the first response including the first device service description.

The second device includes, but is not limited to, a second communication interface and a second processor. The second communication interface is configured to send the first request to retrieve the first device service description from the first device and to receive the first response from the first device. The second processor couples to the second communication interface and is configured to select the first device to perform a first service for the second device based on the context information of the first device included in the first device service description.

Another exemplary embodiment of the invention relates to a method of selecting a device to perform a service. The method includes, but is not limited to, retrieving a first device service description from a first device using a network, the first device service description including context information of the first device, and selecting the first device to perform a first service for a second device based on the context information of the first device included in the first device service description.

The context information of the first device may include, but is not limited to, a geographic location of the first device. Selecting the first device to perform the first service for the second device may include, but is not limited to, pointing the second device at the first device, determining a geographic location of the second device, determining a pointing direction to the first device from the second device, and selecting the first device based on the pointing direction to the first device from the second device, the geographic location of the first device, and the geographic location of the second device.

The method may further include retrieving a second device service description from a third device using the network, the second device service description including context information of the third device, and selecting the third device to perform a second service related to the first service for the second device based on the context information of the third device included in the second device service description.

The context information of the third device may include, but is not limited to, a geographic location of the third device. Selecting the third device to perform the second service for the second device may include, but is not limited to, pointing the second device at the third device, determining a pointing direction to the third device from the second device, and identifying the third device based on the pointing direction to the third device from the second device, the geographic location of the third device, and the geographic location of the second device.

The method may further include selecting an item in a display at the second device while pointing the second device at the first device and releasing the item in the display at the second device while pointing the second device at the third device, thereby copying the item from the first device to the third device.

Another exemplary embodiment of the invention relates to a computer program product for selecting a device to perform a service, the computer program product includes, but is not limited to, computer code configured to retrieve a first device service description from a first device using a network, the first device service description including context information of the first device, and to select the first device to perform a first service for a second device based on the context information of the first device included in the first device service description.

Another exemplary embodiment of the invention relates to a device for performing a service for a second device. The device includes, but is not limited to, a communication interface and a processor. The communication interface is configured to receive a request sent from a first device using a network, the request to perform a service at the device, and the request including context information associated with the service, and to send a response to the first device using the network. The processor couples to the communication interface and is configured to perform the service based on the context information.

Another exemplary embodiment of the invention relates to a device for requesting a service from another device. The device includes, but is not limited to, a communication interface and a processor. The communication interface is configured to send a request using a network to a first device, the request to perform a service at the first device, and the request including context information associated with the service, and to receive a response from the first device. The processor couples to the communication interface and is configured to create the request including the context information.

Another exemplary embodiment of the invention relates to a system for requesting a service from another device. The system includes, but is not limited to, a first device and a second device. The first device includes, but is not limited to, a first communication interface and a first processor. The first communication interface is configured to receive a request sent from a second device using a network, the request to perform a service at the first device, and the request including context information associated with the service, and to send a response to the second device using the network. The first processor couples to the first communication interface and is configured to perform the service based on the context information. The second device includes, but is not limited to, a second communication interface and a second processor. The second communication interface is configured to send the request using the network to the first device, and to receive the response to the request from the first device. The second processor couples to the second communication interface and is configured to create the request including the context information.

Another exemplary embodiment of the invention relates to a method for requesting a service from another device. The method includes, but is not limited to, creating a request, the request to perform a service at a first device, and the request including context information associated with the service, sending the request using a network to the first device, and receiving a response to the request from the first device.

Another exemplary embodiment of the invention relates to a computer program product for requesting a service from another device. The computer program product includes, but is not limited to, computer code configured to create a request, the request to perform a service at a first device, and the request including context information associated with the service, to send the request using a network to the first device, and to receive a response to the request from the first device.

Another exemplary embodiment of the invention relates to a device for performing a service for a second device. The device includes, but is not limited to, a communication interface and a processor. The communication interface is configured to receive a request sent from a first device using a network, the request to perform a service at the device, and to send a response to the first device using the network, the response including context information associated with the service. The processor couples to the communication interface and is configured to create the response including the context information and to perform the service.

Another exemplary embodiment of the invention relates to a device for requesting a service from another device. The device includes, but is not limited to, a communication interface and a processor. The communication interface is configured to send a request using a network to a first device, the request to perform a service at the first device, and to receive a response from the first device, the response including context information associated with the service. The processor couples to the communication interface and is configured to create the request.

Another exemplary embodiment of the invention relates to a system for requesting a service from another device. The system includes, but is not limited to, a first device and a second device. The first device includes, but is not limited to, a first communication interface and a first processor. The first communication interface is configured to receive a request sent from a second device using a network, the request to perform a service at the first device, and to send a response to the second device using the network, the response including context information associated with the service. The first processor couples to the first communication interface and is configured to create the response including the context information and to perform the service. The second device includes, but is not limited to, a second communication interface and a second processor. The second communication interface is configured to send the request using the network to the first device, the request to perform the service at the first device, and to receive a response from the first device. The second processor couples to the second communication interface and is configured to create the request.

Another exemplary embodiment of the invention relates to a method for requesting a service from another device. The method includes, but is not limited to, creating a request, the request to perform a service at a first device, sending the request using a network to the first device, and receiving a response to the request from the first device, the response including context information associated with the service.

Another exemplary embodiment of the invention relates to a computer program product for requesting a service from another device. The computer program product includes, but is not limited to, computer code configured to create a request, the request to perform a service at a first device, to send the request using a network to the first device, and to receive a response to the request from the first device, the response including context information associated with the service.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

DETAILED DESCRIPTION OF THE PREFERRED EMBODIMENTS

The term "device" as used herein includes a variety of network nodes. Such network nodes include printers, workstations, servers (for example, printer servers or file servers), scanners, PCs of all form factors, intelligent appliances (for example, cameras, video cameras, TVs, DVD players, radios), etc. The devices communicate over a network using communication protocols such as, for example, TCP/IP and UDP/IP. A device advertises its ability to perform a service and may be controlled by another device denoted a control point as related previously. The control point listens or searches for devices that it is capable of controlling to identify and to select devices to perform services for the control point. The device advertises its services possibly through an address to a page written in XML format. The XML formatted file includes information about the device and the services that the device may provide and is denoted a device service description. The XML formatted file may also include the address to additional information relating to the services advertised by and provided by the device. The additional information may also be captured in an XML formatted file. The control point may issue simple HTTP Get Requests to retrieve the device service description. The device may respond with an HTTP Get Response that includes the device service description. Using this description, the control point may select the device to perform a particular service for the control point.

Figure 1:
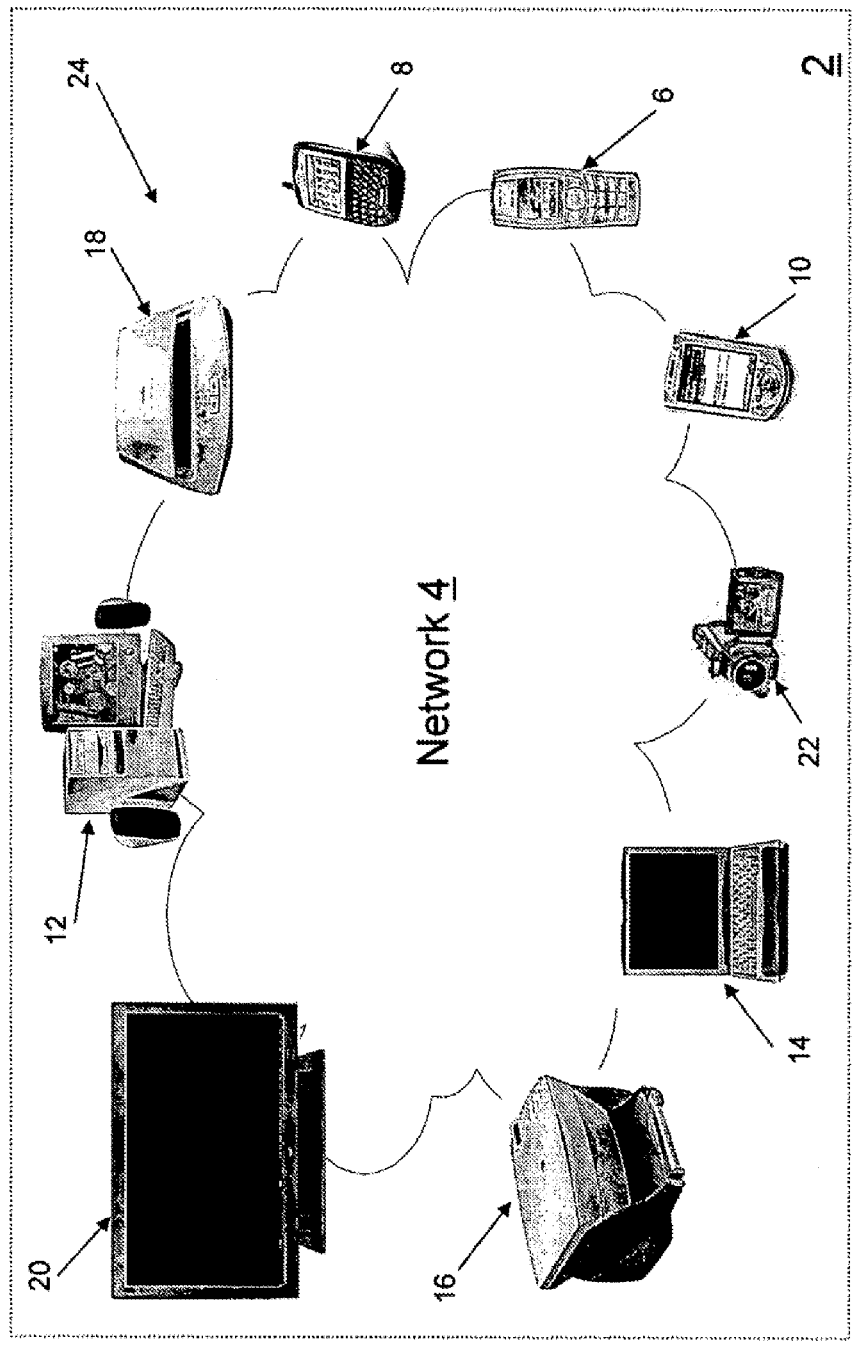
FIG. 1 is an overview diagram of a system in accordance with an exemplary embodiment.

With reference to FIG. 1, the system 2 comprises a network 4. The network 4 includes a plurality of devices 24. The plurality of devices 24 may comprise a cellular telephone 6, an Integrated Communication Device (ICD) 8, a Personal Data Assistant (PDA) 10, a PC 12 of any form factor including a laptop 14, a printer 16, a scanner 18, a TV 20, a video camera 22, etc. The devices 24 may communicate using various transmission technologies including, but not limited to, Code Division Multiple Access (CDMA), Global System for Mobile Communications (GSM), Universal Mobile Telecommunications System (UMTS), Time Division Multiple Access (TDMA), TCP/IP, UDP/IP, Short Messaging Service, Multimedia Messaging Service, e-mail, Instant Messaging, Bluetooth, IEEE 802.11, etc. The devices 24 may communicate using various media including, but not limited to, radio, infrared, laser, cable connection, etc. The network 4 may include additional devices 24. Some or all of the devices 24 of system 2 may comprise a control point device 26. The system 2 may comprise any combination of wired or wireless networks including, but not limited to, a cellular telephone network, a wireless Local Area Network (LAN), a Bluetooth personal area network, an Ethernet LAN, token ring LAN, a wide area network, the Internet, etc. The system 2 may include both wired and wireless devices.

Communication between devices 24, 26 may be through one or more of the following connection methods without limitation: a link established according to the Bluetooth Standards and Protocols, an infrared communications link, a wireless communications link, a cellular network link, a physical serial connection, a physical parallel connection, a link established according to TCP/IP, etc.

Figure 2:
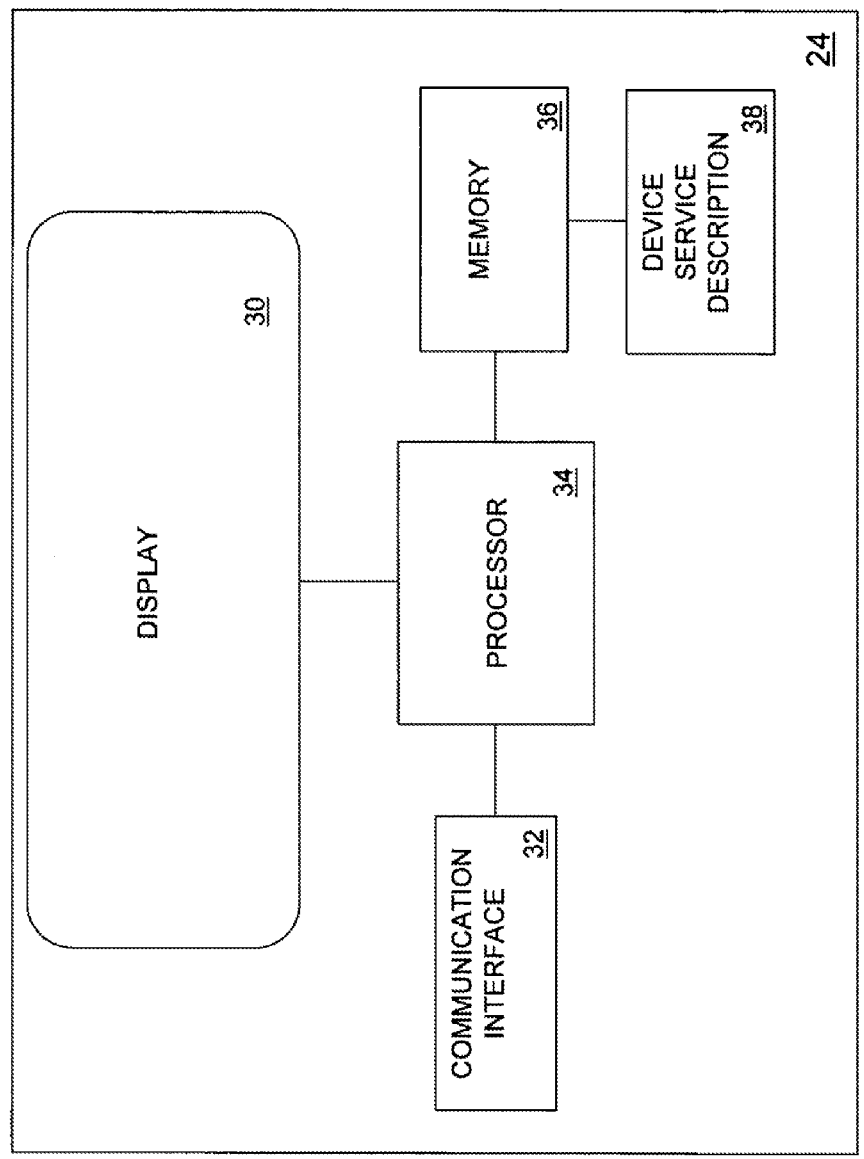
FIG. 2 is a block diagram of a first device in accordance with an exemplary embodiment.

With reference to FIG. 2, the device 24 comprises a display 30, a communication interface 32, a processor 34, a memory 36, and a device service description 38. Different and additional components may be incorporated into the device 24. The display 30 of the device 24 is optional. The display 30 presents information to a user. The display 30 may be a thin film transistor (TFT) display, a light emitting diode (LED) display, a Liquid Crystal Display (LCD), or any of a variety of different displays known to those skilled in the art.

The communication interface 32 provides an interface for receiving and transmitting calls, messages, and any other information communicable between devices. Communications between the device 24 and other devices 24, and/or to the control point device 26 may be through one or more of the following connection methods, without limitation: an infrared communications link, a radio frequency communication link, a wireless communications link, a cellular network link, a link established according to TCP/IP, etc. Transferring content to and from the device may be through one or more of these connection methods. The device 24 may communicate using various transmission technologies including, but not limited to, CDMA, GSM, UMTS, TDMA, TCP/IP, Bluetooth, IrDA, RFID, etc. The device 24 may communicate using various media including, but not limited to, radio, infrared, laser, optical, range reduced Bluetooth, cable connection, etc.

The processor 34 executes instructions that cause the device 24 to behave in a predetermined manner. The instructions may be written using one or more programming languages, scripting languages, assembly languages, etc. Additionally, the instructions may be carried out by a special purpose computer, logic circuits, or hardware circuits. Thus, the processor 34 may be implemented in hardware, firmware, software, or any combination of these methods. The term "execution" is the process of running a program or the carrying out of the operation called for by an instruction. The processor 34 executes an instruction, meaning that it performs the operations called for by that instruction. The processor 34 couples to the communication interface 32.

The processor 34 may retrieve a set of instructions from a permanent memory device and copy the instructions in an executable form to a temporary memory device. The temporary memory device is generally some form of random access memory (RAM). The data in RAM is volatile meaning that it remains only as long as the device is turned on. When the device is turned off, RAM loses its data. Read only memory (ROM) refers to special memory used to store programs that boot the device and perform diagnostics. The values stored in ROM are always there, whether the power is on or not. For this reason, it is called non-volatile memory. Flash memory is a type of constantly-powered nonvolatile memory that can be erased and reprogrammed in units of memory called blocks.

The memory 36 stores the device service description 38. The device may have a plurality of memories 36 using different memory technologies including, but not limited to, RAM, ROM, flash memory, etc. The memory may include a cache. The cache may include, but is not limited to, a dedicated bank of high-speed memory or a reserved section of regular memory used to improve performance. The cache provides a temporary storage area for instructions and data.

The device service description 38 may be a file or web browser page written in XML format. The XML formatted file or page includes information about the device 24 and the services that the device 24 provides. In an exemplary embodiment, the device service description 38 includes context information for the device 24. The context information may include, but is not limited to, a geographic location of the device 24. The context information provides additional information relative to the services provided by the device 24. For example, if the device 24 is a camera, the camera may store context information for each photograph taken by the camera that includes, but is not limited to, a date the photograph is taken, a time the photograph is taken, a location at which the photograph is taken, a subject matter of the photograph, a temperature at the photograph location, a photographer, etc. The camera may store context information describing the context information stored for each picture and/or may store context information related to the camera itself. Context information related to the camera itself may be the geographic location of the camera, a status of the camera battery, a total memory size of a camera memory, a remaining memory size of the camera memory, etc. Context information is also saved relative to each photograph which is an item stored at the camera.

The control point device 26 may send a request to the camera requesting the device service description 38 that includes the context information related to the camera itself. In this example, the response includes the context information in the device service description 38. Based on this information, the control point device 26 may send a request to the camera to send the control point device 26 all of the pictures taken on Aug. 6, 2004. The control point device 26 "discovered" that the camera saved the date information associated with each photograph, and thus, could request the service of getting the photographs based on the date context information. In this example, the request from the control point device 26 includes the context information and the device 24 performs the service based on the context information included with the request. In an alternative embodiment, the device 24 that is a camera may receive a request from the control point device 26 that does not include context information. For example, the control point device 26 sends a request for a list of photographs at the device 24. The device 24 responds with the list of photographs at the device 24 with the list of pictures including the context information associated with each photograph. In this example, the response includes the context information with the response.

Figure 3:
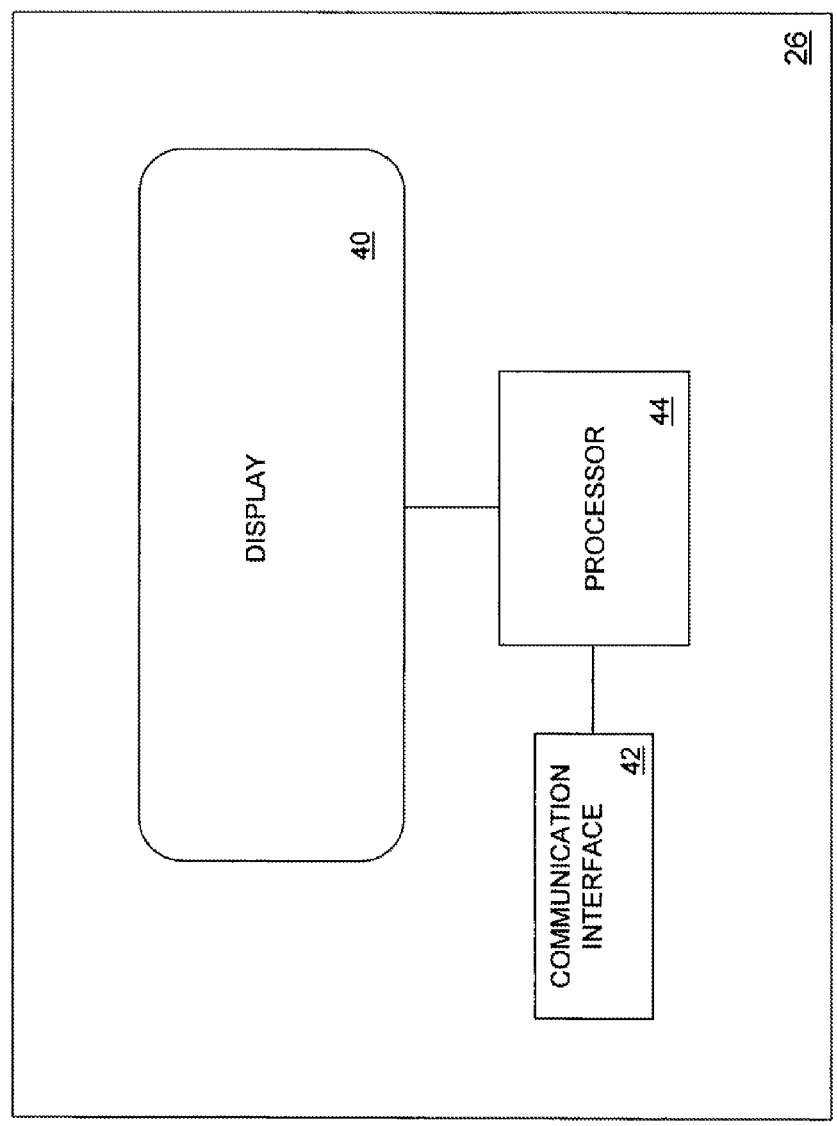
FIG. 3 is a block diagram of a second device in accordance with an exemplary embodiment.

With reference to FIG. 3, the control point device 26 comprises a display 40, a communication interface 42, and a processor 44. Different and additional components may be incorporated into the device 26. The display 40 of the device 26 is optional. The display 40 presents information to a user. The display 40 may be a TFT display, an LED display, an LCD, or any of a variety of different displays known to those skilled in the art.

The communication interface 42 provides an interface for receiving and transmitting calls, messages, and any other information communicable between devices. Communications between the control point device 26 and other control point devices 26, and/or to devices 24 may be through one or more of the following connection methods, without limitation: an infrared communications link, a wireless communications link, a cellular network link, a link established according to TCP/IP, etc. Transferring content to and from the control point device 26 may be through one or more of these connection methods. The control point device 26 may communicate using various transmission technologies including, but not limited to, CDMA, GSM, UMTS, TDMA, TCP/IP, Bluetooth, IrDA, RFID, etc. The control point device 26 may communicate using various media including, but not limited to, radio, infrared, laser, optical, range reduced Bluetooth, cable connection, etc.

The processor 44 executes instructions that cause the device 26 to behave in a predetermined manner. The instructions may be written using one or more programming languages, scripting languages, assembly languages, etc. Additionally, the instructions may be carried out by a special purpose computer, logic circuits, or hardware circuits. Thus, the processor 44 may be implemented in hardware, firmware, software, or any combination of these methods. The processor 44 executes an instruction, meaning that it performs the operations called for by that instruction. The processor 44 couples to the communication interface 42.

Figure 4:
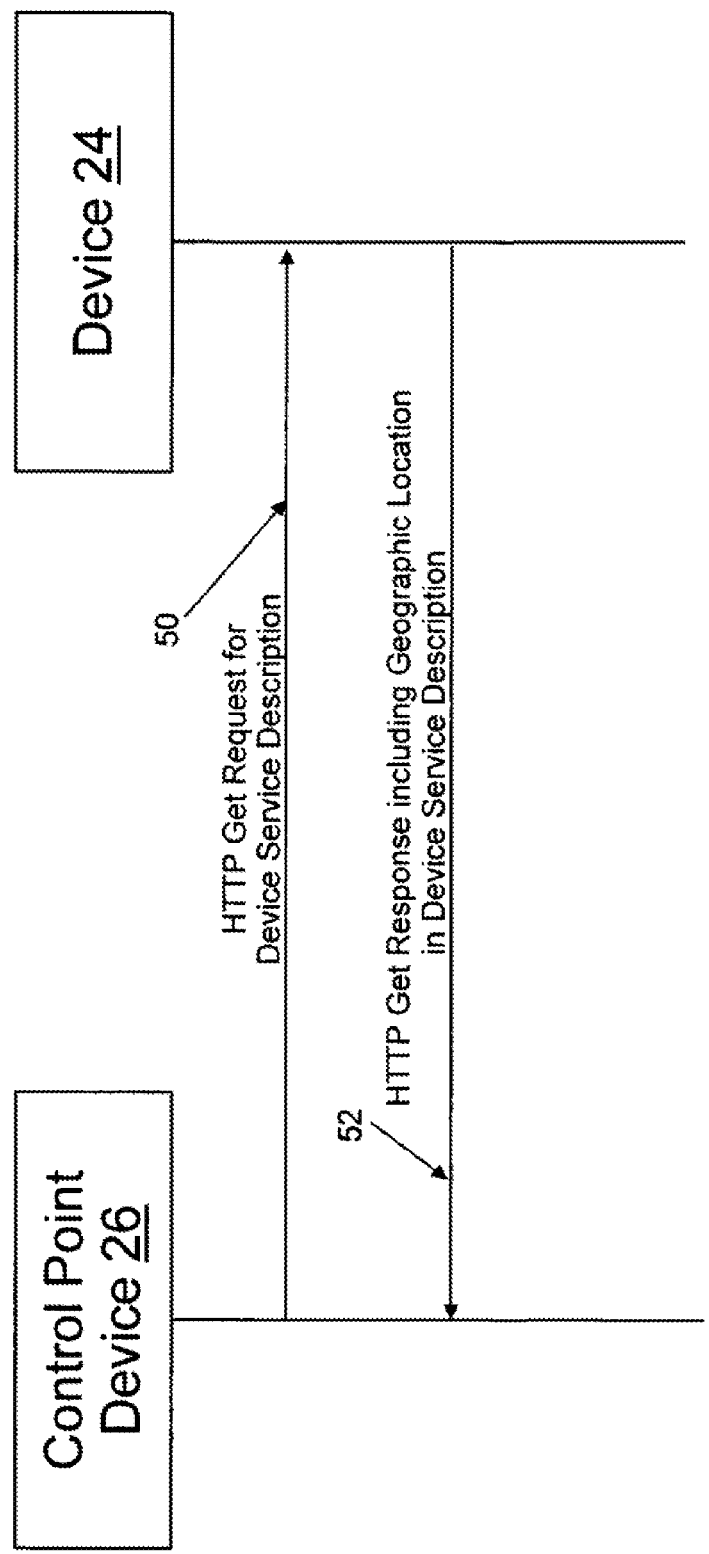
FIG. 4 is an overview diagram of a message sequence in accordance with an exemplary embodiment.

With reference to FIG. 4, an exemplary message sequence between the control point device 26 and the device 24 is shown. The communication interface 42 of the control point device 26 sends an HTTP Get Request 50 to the device 24 to retrieve the device service description 38 from the device 24. The communication interface 32 of the device 24 receives the HTTP Get Request 50 from the control point device 26. The processor 34 of the device 24 processes the received HTTP Get Request 50 and selects the device service description 38 from the memory 36. The processor 34 of the device 24 creates an HTTP Get Response 52 that includes the device service description. The communication interface 32 of the device 24 sends the HTTP Get Response 52 to the control point device 26. The communication interface 42 of the control point 26 receives the HTTP Get Response 52 including the device service description 38. The processor 44 of the control point device 26 processes the received HTTP Get Response 52 and selects the device 24 to perform a service for the control point device 26 based, for example, on the geographic location of the device 24 included in the device service description 38 and/or any other the context information of the device 24 included in the device service description 38. The message format may be, but is not limited to, SSDP or SOAP.

Figure 5:
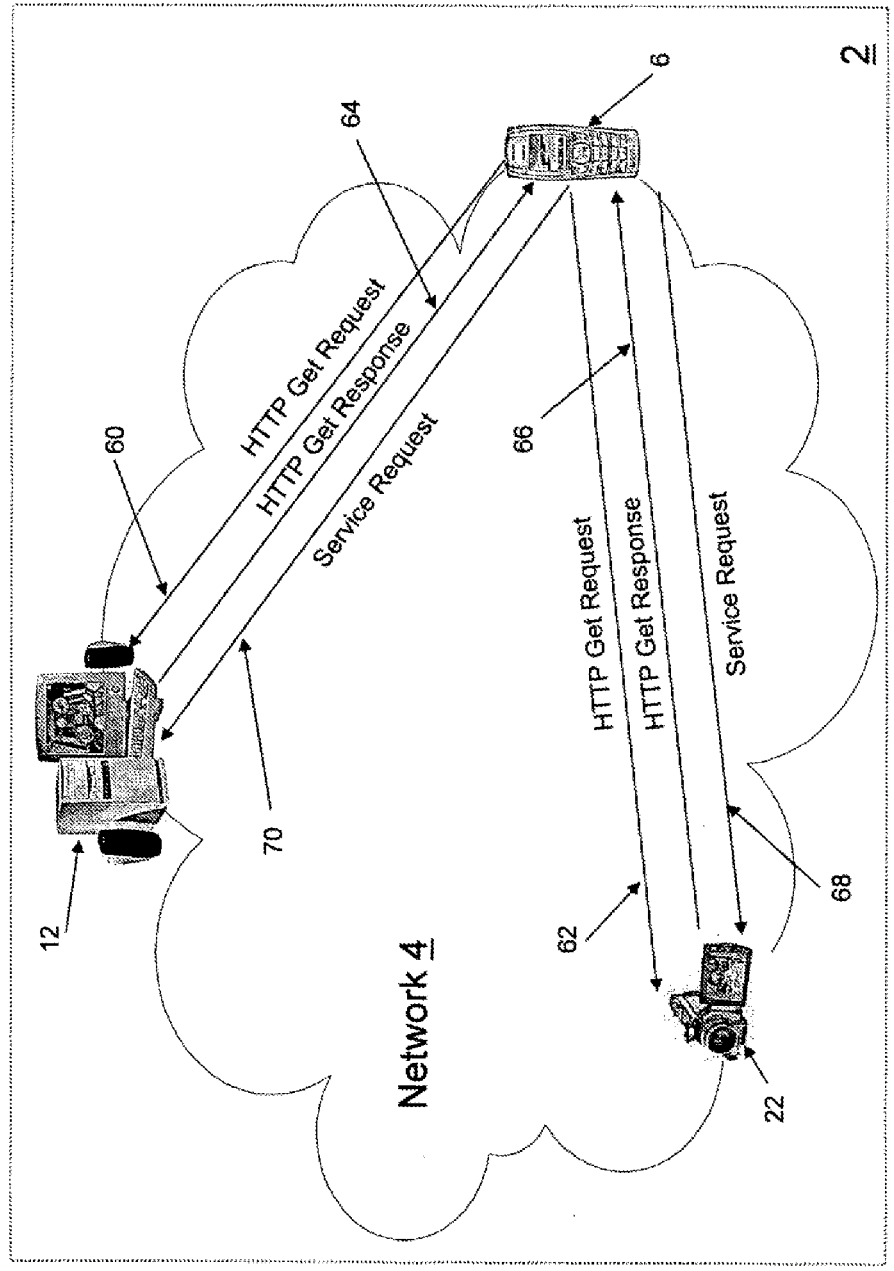
FIG. 5 is an overview diagram of a sample use case in accordance with an exemplary embodiment.

FIG. 5 shows an example use case of the system 2. The network 4 includes the cellular telephone 6, the PC 12, and the video camera 22. The cellular telephone 6 may be the example control point device 26. The PC 12 and the video camera 22 may be example devices 24. The cellular telephone 6 sends an HTTP Get Request 60 to the PC 12 to retrieve a device service description from the PC 12. Similarly, the cellular telephone 6 sends an HTTP Get Request 62 to the video camera 22 to retrieve a device service description from the video camera 22. The PC 12 creates an HTTP Get Response 64 that includes the device service description of the PC 12 and sends the HTTP Get Response 64 to the cellular telephone 6. Similarly, the video camera 22 creates an HTTP Get Response 66 that includes the device service description of the video camera 22 and sends the HTTP Get Response 66 to the cellular telephone 6.

The cellular telephone 6 selects the video camera 22 to perform service request 68 by pointing the cellular telephone 6 at the video camera 22 and selecting the video camera 22 based on the geographic location information contained in the context information include in the device service description of the video camera 22. The cellular telephone 6 may use a local compass or other similar sensor to determine the pointing direction of the cellular telephone 6 to the video camera 22. The cellular telephone 6 and/or the video camera 22 may use, for example, a global positioning system to determine the geographic location of the cellular telephone 6 and the video camera 22 respectively as known to those skilled in the art.

Service request 68 may be a request that the video camera 22 send a video clip taken at a specified time on a specified date to the cellular telephone 6 using the context information included with the service request 68. Similarly, the cellular telephone 6 selects the PC 12 to perform service request 70 by pointing the cellular telephone 6 at the PC 12 and selecting the PC 12 based on the geographic location information contained in the device service description of the PC 12. The cellular telephone 6 may use a local compass or other similar sensor to identify the PC 12 using the pointing direction of the cellular telephone 6. Service request 70 may be a request that the PC 12 copy the specified video clip sent through the cellular telephone 6.

Additionally, a control point device 26 may search for services based on the ability of the device 24 to support the use of context information instead of based on the context information itself. For example, a camera may attempt to locate a content directory service that supports the use of context information. The content directory service may store the content of items and/or containers and provide browsing and searching for the items and/or the containers. The camera provides context information with each photograph, and thus, requests a content directory service that also supports use of the context information.

Context information may include usage history that lists each user using the device and/or service, when the device and/or service is used, what control point is used to request the service, etc. Context triggered messages may be initiated from the device such as reminders or notifications based on the context information that the device stores. Thus, messages also may be initiated from the device 24 to the control point device 26.

It is understood that the invention is not confined to the particular embodiments set forth herein as illustrative, but embraces all such modifications, combinations, and permutations as come within the scope of the following claims. Thus, the description of the preferred embodiments is for purposes of illustration and not limitation.

What is claimed is:

1. A device comprising:
    a communication interface, wherein the communication interface is configured to:
        send, from the communication interface of the device, a first request to a first device using a universal plug and play network, the first request to retrieve a first device service description from the first device;
        the first device service description being contained in a first file and comprising:
            information about the first device;
            information about the services provided by the first device; and information associated with a second file, the second file containing context information;
        the context information comprising additional information not in the first device service description, the context information concerning at least one of:
            the first device;
            the services provided by the first device; and
            one or more items related to the first device; and
        receive, by the communication interface of the device, a first response from the first device using the universal plug and play network, the first response including the first device service description; and
    a processor coupled to the communication interface, the processor configured to select the first device to perform a first service based on the context information.

2. The device of claim 1, wherein a format of the response is a format selected from the group consisting of a simple service discovery protocol and a simple object access protocol.

3. The device of claim 1, wherein a format of the request is a format selected from the group consisting of a simple service discovery protocol and a simple object access protocol.

4. The device of claim 1, wherein the context information of the first device comprises a geographic location of the first device.

5. The device of claim 4, wherein the processor is further configured to:
    determine a geographic location of the device;
    determine a pointing direction to the first device from the device; and
    identify the first device based on the pointing direction to the first device from the device, the geographic location of the first device, and the geographic location of the device.

6. The device of claim 5, wherein the communication interface is further configured to:
    send a second request to a second device using the network, the second request to retrieve a second device service description from the second device, the second device service description including context information of the second device; and
    receive a second response from the second device using the network, the second response including the second device service description; and
    wherein the processor is further configured to select the second device to perform a second service related to the first service for the device based on the context information of the second device included in the second device service description.

7. The device of claim 6, wherein the context information of the second device includes a geographic location of the second device.

8. The device of claim 7, wherein the processor is further configured to:
    determine a pointing direction to the second device from the device; and
    identify the second device based on the pointing direction to the second device from the device, the geographic location of the second device, and the geographic location of the device.

9. A computer program product, embodied on a non-transitory computer readable medium, for selecting a device to perform a service, the computer program product comprising:

computer code configured to:
retrieve a first device service description from a first file stored on a first device using a universal plug and play network;
the first device service description comprising:
information about the first device;
information about the services provided by the first device; and
information associated with a second file, the second file containing context information of the first device
the context information comprising additional information not in the first device service description, the context information concerning at least one of:
the first device;
the services provided by the first device; and
one or more items related to the first device; and
select the first device to perform a first service for a second device based on the context information.

10. A device comprising:
a communication interface, wherein the communication interface is configured to:
receive, by the communication interface, a request sent from a first device using a universal plug and play network, the request to perform a service at the device, the request including context information associated with the service, the context information comprising information of the service;
wherein the information of the service is in addition to information about the device and the service contained in a device service description associated with the device;
wherein the device service description is stored in a first file of the device and the context information is stored in a second file referenced within the first file; and
send, from the communication interface of the device, a response to the first device using the network; and
a processor coupled to the communication interface, the processor configured to perform the service based on the context information.

11. A device comprising:
a communication interface, wherein the communication interface is configured to:
send, from the communication interface of the device, a request using a universal plug and play network to a first device, the request to perform a service at the first device;
the request including context information associated with the service, the context information comprising information of the service;
wherein the information of the service is in addition to information about the first device and the service contained in a device service description associated with the first device;
wherein the device service description is stored in a first file of the first device and the context information is stored in a second file referenced within the first file; and
receive, by the communication interface of the device, a response from the first device; and
a processor coupled to the communication interface, the processor configured to create the request including the context information.

12. A system comprising:
a first device, the first device comprising:
a first communication interface, wherein the first communication interface is configured to:
receive, by the first communication interface of the first device, a request sent from a second device using a universal plug and play network, the request to perform a service at the first device, the request including context information associated with the service, the context information comprising information of the service;
wherein the information of the service is in addition to information about the first device and the service contained in a device service description associated with the first device;
wherein the device service description is stored in a first file of the first device; and the context information is stored in a second file referenced within the first file; and
send, by the first communication interface of the first device, a response to the second device using the network; and
a first processor coupled to the first communication interface, the first processor configured to perform the service based on the context information; and
the second device comprising:
a second communication interface, wherein the second communication interface is configured to:
send, from the second communication interface of the second device, the request using the network to the first device; and
receive, by the second communication interface of the second device, the response to the request from the first device; and
a second processor coupled to the second communication interface, the second processor configured to create the request including the context information.

13. A method comprising:
creating a request, the request to perform a service at a first device, the request including context information associated with the service, the context information comprising information of the service;
wherein the information of the service is in addition to information about the first device and the service contained in a device service description associated with the first device;
wherein the device service description is stored in a first file of the first device and the context information is stored in a second file referenced within the first file;
sending the request using a universal plug and play network to the first device; and
receiving a response to the request from the first device.

14. A computer program product, embodied on a non-transitory computer readable medium, for requesting a service from another device, the computer program product comprising:
computer code configured to:
create a request, the request to perform a service at a first device, the request including context information associated with the service, the context information comprising information of the service;
wherein the information of the service is in addition to information about the first device and the service contained in a device service description associated with the first device;
wherein the device service description is stored in a first file of the first device and the context information is stored in a second file referenced within the first file;
send, a second device, the request using a universal plug and play network to the first device; and receive, by a second device, a response to the request from the first device.

15. A device comprising:
a communication interface, wherein the communication interface is configured to:
receive, by the communication interface of the device, a request sent from a first device using a universal plug and play network, the request to perform a service at the device; and
send, from the communication interface of the device, a response to the first device using the network, the response including context information associated with the service, the context information comprising information of the service;
wherein the information of the service is in addition to information about the device and the service contained in a device service description associated with the device;
wherein the device service description is stored in a first file of the device and the context information is stored in a second file referenced within the first file; and
a processor coupled to the communication interface, the processor configured to:
create the response including the context information; and
perform the service based on the context information.

16. A device comprising:
a communication interface, wherein the communication interface is configured to:
send, from the communication interface of the device, a first request using a universal plug and play network to a first device;
receive, by the communication interface of the device, a response from the first device, the response including context information associated with a service, the context information comprising information of the service;
wherein the information of the service is in addition to information about the first device and the service contained in a device service description associated with the first device;
wherein the device service description is stored in a first file of the first device and the context information is stored in a second file referenced within the first file; and
send, from the communication interface of the device, a second request to perform the service at the first device based on the context information; and
a processor coupled to the communication interface, the processor configured to create the first and second requests.

17. A system comprising:
a first device, the first device comprising:
a first communication interface, wherein the first communication interface is configured to:
receive, by the first communication interface of the first device, a first request sent from a second device using a universal plug and play network;
send, from the first communication interface of the first device, a response to the second device using the network, the response including context information associated with a service, the context information comprising information of the service;
wherein the information of the service is in addition to information about the first device and the service contained in a device service description associated with the first device;
wherein the device service description is stored in a first file of the first device; and the context information is stored in a second file referenced within the first file; and
receive, by the first communication interface of the first device, a second request to perform the service at the first device based on the context information; and
a first processor coupled to the first communication interface, the first processor configured to:
create the response including the context information; and
perform the service based on the context information, and
the second device comprising:
a second communication interface, wherein the second communication interface is configured to:
send, from the second communication interface of the second device, a first request using the network to the first device;
receive, by the second communication interface of the second device, a response from the first device; and
send, by the second communication interface of the second device, a second request to perform the service at the first device; and
a second processor coupled to the second communication interface, the second processor configured to create the first and second requests.

18. A method comprising:
creating a request, the request to perform a service at a first device;
sending, from a second device, the request using a universal plug and play network to the first device;
receiving, by the second device, a response to the request from the first device, the response including context information associated with the service, the context information comprising information of the service;
wherein the information of the service is in addition to information about the device and the service contained in a device service description associated with the device; and
wherein the device service description is stored in a first file of the device and the context information is stored in a second file referenced within the first file.

19. A computer program product, embodied on a non-transitory computer readable medium, for requesting a service from another device, the computer program product comprising:
computer code configured to:
create a request, the request to perform a service at a first device;
send, from a second device, the request using a universal plug and play network to the first device;
receive, by a second device, a response to the request from the first device, the response including context information associated with the service, the context information comprising information of the service;
wherein the information of the service is in addition to information about the device and the service contained in a device service description associated with the device; and
wherein the device service description is stored in a first file of the device and the context information is stored in a second file referenced within the first file.

* * * * *